US012585250B2

(12) United States Patent
Guo et al.

(10) Patent No.: US 12,585,250 B2
(45) Date of Patent: Mar. 24, 2026

(54) SYSTEM AND METHOD FOR CYCLE TIME ANALYSIS AND BOTTLENECK DETECTION IN SMART FACTORY ASSEMBLY LINES

(71) Applicant: Robert Bosch GmbH, Stuttgart (DE)

(72) Inventors: Jiajing Guo, Mountain View, CA (US);
Liang Gou, San Jose, CA (US);
Samuel Kimport, Campbell, CA (US);
Liu Ren, Saratoga, CA (US)

(73) Assignee: Robert Bosch GmbH (DE)

( * ) Notice: Subject to any disclaimer, the term of this patent is extended or adjusted under 35 U.S.C. 154(b) by 396 days.

(21) Appl. No.: 18/368,433

(22) Filed: Sep. 14, 2023

(65) Prior Publication Data

US 2025/0093857 A1 Mar. 20, 2025

(51) Int. Cl.
*G05B 19/418* (2006.01)
(52) U.S. Cl.
CPC ................................ *G05B 19/4183* (2013.01)
(58) Field of Classification Search
USPC ........................................................... 700/9
See application file for complete search history.

(56) References Cited

U.S. PATENT DOCUMENTS

| | | | | |
|---|---|---|---|---|
| 7,043,318 | B1 * | 5/2006 | Barto | ..................... G06N 5/043 |
| | | | | 703/22 |
| 2014/0129531 | A1 * | 5/2014 | Liu | ....................... G06F 16/211 |
| | | | | 707/703 |

| | | | | |
|---|---|---|---|---|
| 2020/0027173 | A1 * | 1/2020 | Sun | .................. G06Q 10/06393 |
| 2022/0317648 | A1 * | 10/2022 | Maruyama | ............ G06F 11/302 |
| 2024/0142344 | A1 * | 5/2024 | Yuan | ...................... G06Q 50/04 |

OTHER PUBLICATIONS

Jacobs et al. "Characterization_of_operational_time_variability_using_effective_process_times", IEEE, Aug. 2003, p. 511-520. (Year: 2003).*
Chang et al. "Supervisory Factory Control Based on Real-Time Production Feedback", Journal of MSE, 2007, p. 653-660. (Year: 2007).*

(Continued)

*Primary Examiner* — Hien D Khuu
(74) *Attorney, Agent, or Firm* — Dickinson Wright PLLC

(57) ABSTRACT

In some implementations, the device may receive, for a plurality of stations, processing times indicating a time required for a part to be processed by each station, and waiting times indicating how long the part waited before moving to a subsequent one of the plurality of stations. In addition, the device may determine, cycle times for a predetermined window of time, where the cycle times indicates an average number of parts processed by the plurality of stations during the predetermined window of time. The device may determine one of the stations as a potential bottleneck station. Moreover, the device may display, to a user, the potential bottleneck station as a visualization which includes the processing time, the waiting time, and the cycle time of the potential bottleneck station. Also, the device may receive, from the user, a user feedback related to the potential bottleneck station.

17 Claims, 12 Drawing Sheets

*300*

(56) References Cited

OTHER PUBLICATIONS

Zhou et al. "Multi-Agent Based Hyper-Heuristics for MultiObjective Flexible Job Shop Scheduling: A Case Study in an Aero-Engine Blade Manufacturing Plant", IEEE, Feb. 5, 2019, p. 21147-21176. (Year: 2019).*

CN_115310922_A (Year: 2022).*

CN_110419010_B (Year: 2022).*

Maio et al. "Real-Time_Data_Monitoring_of_an_Industry_4.0_Assembly_Line", IEEE, Mar. 1, 2023, p. 414-417. (Year: 2023).*

Panpan Xu et al. "ViDX: Visual Diagnostics of Assembly Line Performance in Smart Factories." 2015, 10 Pages.

Thomas Houy, "ICT and Lean Management: Will They Ever Get Along." Communication Strategies, Sep. 2005, 21 Pages.

Mukund Subramaniyan et al. "An Algorithm for Data-Driven Shifting Bottleneck Detection." Cogent Engineering, 2016, 3:1, 1239516, 20 Pages.

Christopher Roser et al. "A Quantitative Comparison of Bottleneck Detection Methods in Manufacturing Systems With Particular Consideration for Shifting Bottlenecks." ResearchGate, Conference Paper, Sep. 2015, 8 Pages.

* cited by examiner

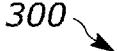

300

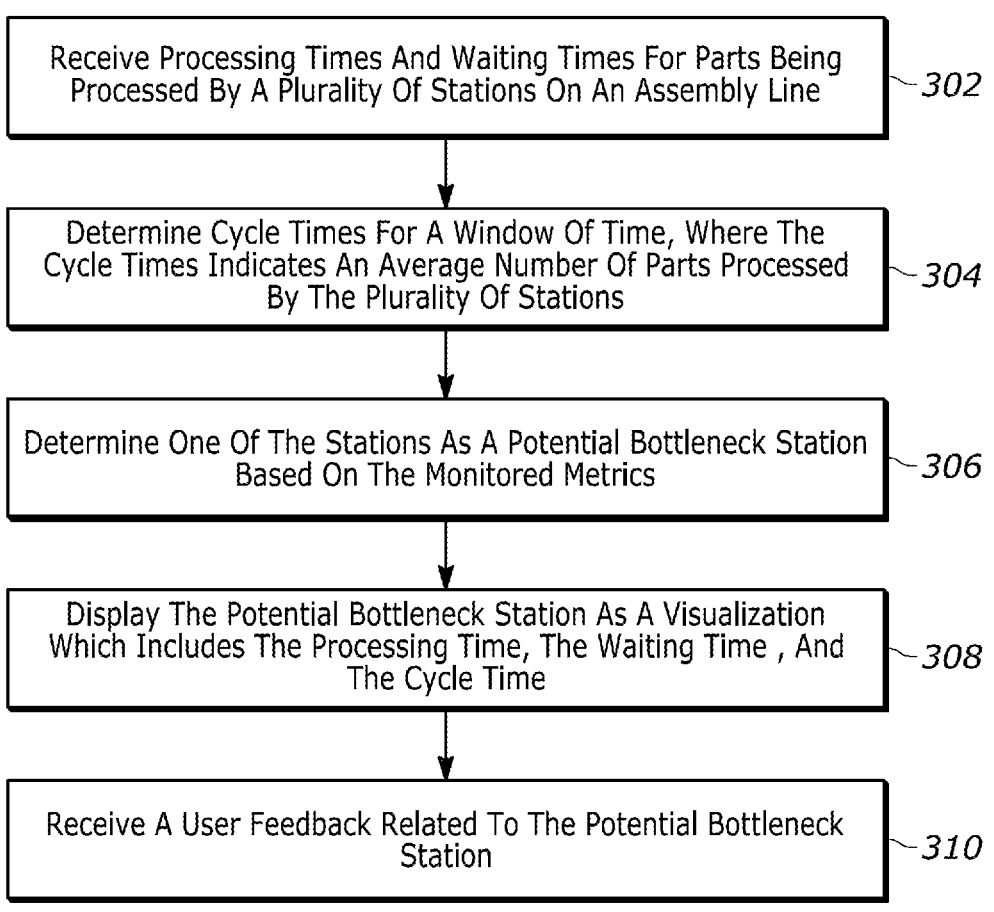

Receive Processing Times And Waiting Times For Parts Being Processed By A Plurality Of Stations On An Assembly Line    ~302

Determine Cycle Times For A Window Of Time, Where The Cycle Times Indicates An Average Number Of Parts Processed By The Plurality Of Stations    ~304

Determine One Of The Stations As A Potential Bottleneck Station Based On The Monitored Metrics    ~306

Display The Potential Bottleneck Station As A Visualization Which Includes The Processing Time, The Waiting Time , And The Cycle Time    ~308

Receive A User Feedback Related To The Potential Bottleneck Station    ~310

FIG. 3

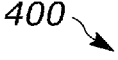

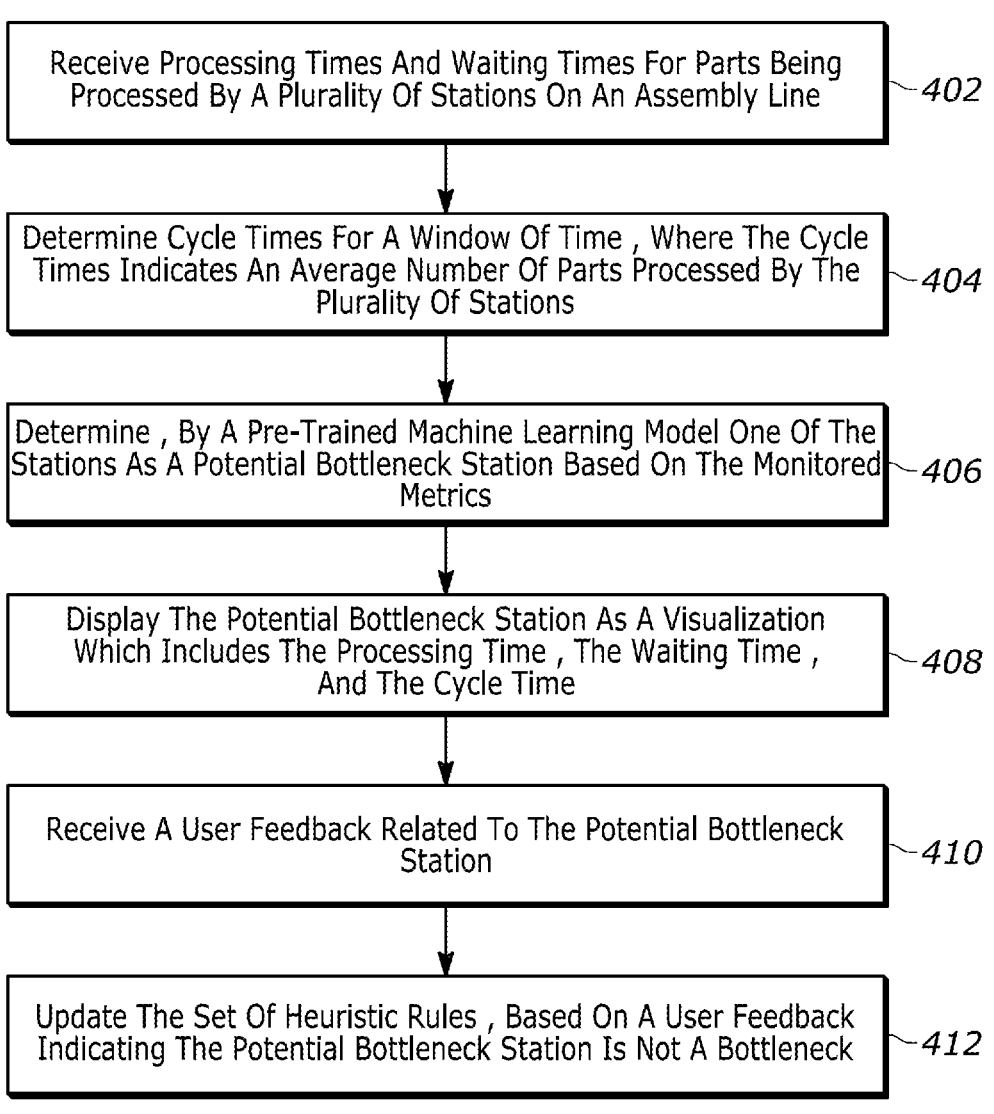

400

Receive Processing Times And Waiting Times For Parts Being Processed By A Plurality Of Stations On An Assembly Line ~402

Determine Cycle Times For A Window Of Time , Where The Cycle Times Indicates An Average Number Of Parts Processed By The Plurality Of Stations ~404

Determine , By A Pre-Trained Machine Learning Model One Of The Stations As A Potential Bottleneck Station Based On The Monitored Metrics ~406

Display The Potential Bottleneck Station As A Visualization Which Includes The Processing Time , The Waiting Time , And The Cycle Time ~408

Receive A User Feedback Related To The Potential Bottleneck Station ~410

Update The Set Of Heuristic Rules , Based On A User Feedback Indicating The Potential Bottleneck Station Is Not A Bottleneck ~412

FIG. 4

SYSTEM AND METHOD FOR CYCLE TIME ANALYSIS AND BOTTLENECK DETECTION IN SMART FACTORY ASSEMBLY LINES

TECHNICAL FIELD

The present disclosure relates to determining a bottleneck in a smart factory assembly line.

BACKGROUND

Compared with traditional manufacturing environments, smart assembly lines are often equipped with digitalized machines that can record and store each condition change and abnormal events. Access to data and the analytics from the digitized machines provides insight and convenience to managers and operators while performing troubleshooting and assembly line optimization. Among all the investigations, bottleneck detection is one of the most important items that affects production line performance.

Bottlenecks in production lines refers to the station that requires longer process time in comparison to other stations. Bottlenecks can lead to decreased output, longer throughput time, and higher work in progress. As a result, bottlenecks impede the performance of the entire line. Bottlenecks are often shifting depending on the machine conditions, material supplies, and workers.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method may include receiving, for a plurality of stations, processing times indicating a time required for a part to be processed by each station, and waiting times indicating how long the part waited before moving to a subsequent one of the plurality of stations. Method may also include determining, for the plurality of stations, cycle times for a predetermined window of time, where the cycle times indicates an average number of parts processed by the plurality of stations during the predetermined window of time. Method may furthermore include determining one of the stations as a potential bottleneck station based on the processing times, the waiting times, and the cycle times. Method may in addition include displaying, to a user, the potential bottleneck station as a visualization which includes the processing time, the waiting time, and the cycle time of the potential bottleneck station. Method may moreover include receiving, from the user, a user feedback related to the potential bottleneck station. Other embodiments of this aspect include corresponding computer systems, apparatus, and computer programs recorded on one or more computer storage devices, each configured to perform the actions of the methods.

Implementations may include one or more of the following features. Method where the determining of the one or more stations as the potential bottleneck station is further based on a comparison between an average cycle time of each station and a user-defined average cycle time threshold. Method where the determining of the one or more stations as the potential bottleneck station is performed by a pre-trained machine learning model. Method may include: determining, by the pre-trained machine learning model, a potential bottleneck based on a set of heuristic rules; and updating the set of heuristic rules, based on a user feedback indicating the potential bottleneck station is not a bottleneck, to output a result that is may include with the user feedback. Method may include: training the pre-trained machine learning model based on the processing time, the waiting time, the cycle time of the potential bottleneck station, and the user feedback. Method where the user feedback indicates that the potential bottleneck station is one of: an expected bottleneck, an unexpected bottleneck, and not a bottleneck. Method where the user feedback indicates that the potential bottleneck station is not a bottleneck, the method may include: updating the visualization to indicate that the potential bottleneck station is not a bottleneck. Implementations of the described techniques may include hardware, a method or process, or a computer tangible medium.

Implementations of the described techniques may include hardware, a method or process, or a computer tangible medium.

BRIEF DESCRIPTION OF THE DRAWINGS

FIG. 3 is a flowchart of an example process for identifying a potential bottle neck in an assembly line.

FIG. 4 is a flowchart of an example process which focuses on utilization of a machine learning model in identifying potential bottlenecks in an assembly line.

DETAILED DESCRIPTION

Figure 1:
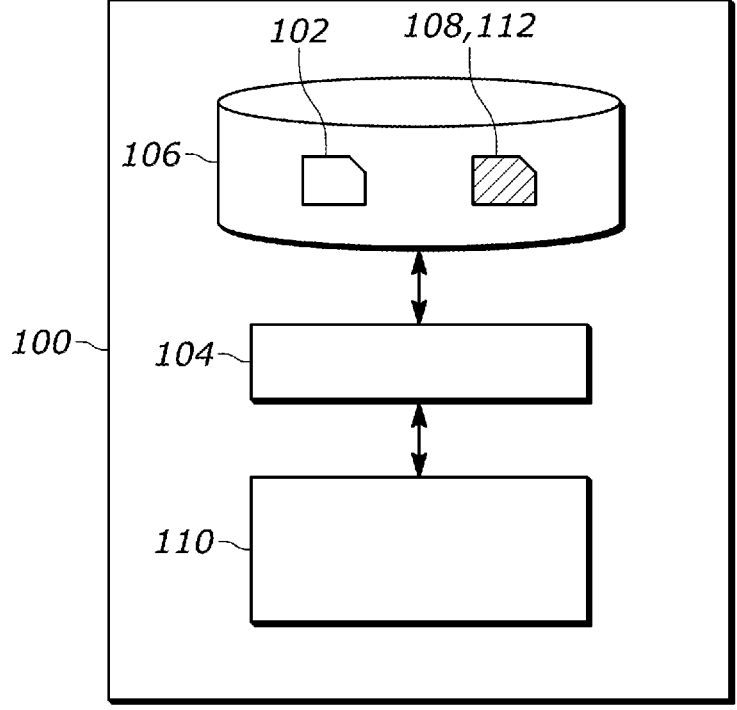
FIG. 1 shows a system for training a neural network.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

"A", "an", and "the" as used herein refers to both singular and plural referents unless the context clearly dictates otherwise. By way of example, "a processor" programmed to perform various functions refers to one processor programmed to perform each and every function, or more than one processor collectively programmed to perform each of the various functions.

In this disclosure, the systems and methods described herein proposes a novel bottleneck detection framework to support industrial production in an industrial setting, reduce unnecessary human labor, and improve productivity. The systems and methods described herein may be configured to include the steps of data aggregation, user query, bottleneck detection, and result visualization.

Bottlenecks in an assembly line are often shifting and sensitive to machine conditions, materials, and operator performance. Therefore, real-time detection based on streaming data may not be accurate and may mislead shop floor managers and operators. The systems and method described herein propose a scalable batch-based process that aggregates cycle time values of a station in a certain time period, for detecting the bottlenecks.

Outlier Removal

Data received from stations in an assembly line may include noise and outlier values. For example, a station may take 30 seconds to process a part, however, when the station experiences errors, the data may not be correctly recorded. When an error occurs the calculated cycle time may increase by many magnitudes. Therefore, removing outliers is an important step in production data analysis. The systems and method described herein may be configured to utilize a variety of approaches to remove outliers, such as: percentile (i.e., the top and bottom x % of values may be removed), median 2SD (i.e., values that are more than two standard deviations away from the median may be removed), mode 50% (i.e., values that are larger or smaller than 50% of the mode may be removed), domain specific criteria (e.g., the smallest 50 values will be retained), or any suitable outlier removal approach.

Customized Configurations

The systems and methods described herein may, after removing the outliers, selectively aggregate cycle time values based on predetermined customized configurations. These configurations may be requested by the end users. The predetermined configurations may include, but are not limit to, time window size and part types. Time window size refers to the time period which defines time window (e.g., minutes and seconds). Part types refers to category parts specific to each assembly line, where different part types may have different processing time.

Batch-based Aggregation

The systems and methods described herein may aggregate stations' cycle time data each station of the assembly line. In some embodiments, aggregation refers to the procedure which compresses all the cycle time values which meet the customized configuration requirements for a station into a single value. For example, a production line may process one hundred parts in an hour and the systems and methods described herein may be configured to calculate a number to represent the performance of a specific hour. Aggregation methods include but are not limited to average (i.e., the average cycle time values of processed parts), median (i.e., the median cycle time values of processed parts), and average of mode (i.e., the average of cycle time values that are one standard deviation away from the mode).

The systems and methods described herein may be configured to calculate aggregation based on all possible configurations. For example, when there are four time window sizes (0.5 hour, 1 hour, 2 hours, and 8 hours), five outlier removal methods, 12 part types, and three aggregation methods, the batch-based aggregation will combine the above options. In some embodiments, the computation may be performed locally in the factories or in the cloud. All the data may be stored on computing devices locally in the assembly line facility or remotely in the cloud.

In some embodiments, the data aggregation may be performed on batched streaming data, wherein the data may be aggregated when it is stored in the database. Data aggregation may also be performed as the user queries data. In some embodiments, precomputing data may greatly reduce the query time.

Bottleneck Detection

Bottlenecks in a production line refers to the machine/station that requires a longer process time than the other stations. The systems and methods described herein propose an aggregated time window approach. The systems and methods described herein may be configured to receive aggregated cycle time data and detect potential bottleneck candidates.

The systems and methods described herein may be configured to utilize detection algorithms which include, but are not limited to, heuristic approach (e.g., stations with top 10% or 25% cycle time values) and machine learning method (e.g., logistic regression on time-series data).

The systems and methods described herein may detect bottlenecks based on candidate-pool based heuristic and supervised approaches.

A Candidate-pool based Heuristic Approach

The systems and methods described herein may be configured to identify the station with the longest process time as a bottleneck. However, due to the inevitable errors in cycle time aggregation as well as subtle differences across stations (e.g., two stations may have only a 0.1 second difference), it may not be accurate to identify a single station as a bottleneck. Therefore, the systems and methods described herein may be configured to utilize a candidate-pool based heuristic approach, such that a group of stations may be identified as a candidate pool of bottlenecks. The candidate pool of bottlenecks may be presented to the user to validate and investigate. The user may also customize the parameters (e.g., 10th or 25th percentiles).

The systems and methods described herein may be configured to generate a visualization where two horizontal lines represent the thresholds of two heuristic approaches. In some embodiments, the first line uses percentile 10, where stations whose aggregated cycle time are longer than the top 10% of the 18 stations will be identified as a candidate pool of bottlenecks. In some embodiments, the second line presents the threshold of percentile 25, which identifies stations with top 25% aggregated cycle time as a candidate pool of bottlenecks.

Supervised Approach

In some embodiments, the bottleneck detection utilizes a supervised approach, which depends on supervised machine learning algorithms. The machine learning model may take cycle time values, timestamps, part types, assembly lines, and any relevant information as input, and outputs potential bottlenecks.

The systems and methods described herein may use supervised machine learning algorithms, such as time series logistic regression or deep neural network, to identify potential bottlenecks.

The systems and methods described herein may utilize a heuristic-based approach which may bootstrap a supervised machine learning approach with human annotations. In some embodiments, the user may give feedback regarding the proposed station being an expected bottleneck, an unexpected bottleneck, or not a bottleneck. The systems and methods described herein may store data by uploading to the cloud as training data which may be used in future bottleneck detection tasks.

Aggregated Time Window

Detecting bottlenecks based on an entire day's data may not provide accurate information, and does not support the user's desire to see granular data.

The systems and methods described herein may utilize aggregated time windows, which use batched data and detects bottlenecks across multiple time windows. For example, a first time window 1 pm to 2 pm may detect Station 2 as a bottleneck; in a second time window 2 pm to 3 pm, Station 3 and 4 may be detected as bottlenecks; in a third time window 3 pm to 4 pm, Station 2 may be detected as the bottleneck for a second time. The systems and methods described herein would be configured to aggregate the results of the time windows from 1 pm to 8 pm and produce a histogram which visualizes the frequency of each station being detected as a bottleneck.

Frontend: An Interactive Analytics Dashboard

The systems and methods described herein may be configured to further provide a visual analytics dashboard for a user to explore. In some embodiments, the visualization may be configured to display the data population as well as the bottleneck detection results and enable a user to explore the detailed information of bottleneck stations and relevant parts.

In some embodiments, the user may select which assembly lines and date periods to explore. A time period may vary from several days to several hours. The system and methods described herein may be configured to query the assembly line's data from the individual and aggregated cycle time database. In some embodiments, the dashboard may display basic statistics of production in the user selected period, including but not limited to: number of parts, number of error parts, number of part types, and duration of downtime.

The systems and methods disclosed herein may be configured to display a main dashboard including, but not limited to, the following components: stations' cycle time trends, parts cycle time, and line-based throughput time.

Cycle Time Trends and Bottlenecks

The cycle time trends component may enable a user to see the results of bottled detection and to explore the aggregated cycle times across various time windows.

For example, a user may open the dashboard to see the data related to the previous day. The user may select the date and desired time window. In some embodiments the user may see four types of parts, of which, 3398 parts were processed. The user may further examine bottleneck frequency where as a visualization having an x-axis which represents Stations and a y-axis which represents counts of being identified as a bottleneck. The visualization may indicate that Station 421.1.1.1, 440.1.1.1.1, 440.1.2.3.1, and 440.1.3.33.1 are identified as being potential bottlenecks. The visualization may further reveal that the top three stations have the highest cycle time, in comparison to the other stations.

The user may select a user interface elements representing Station 440.1.1.1.1 to display a scatter plot of cycle time which will populate to the right of the user interface element. In some embodiments, the scatter plot includes an x-axis representing the timestamp, and a y-axis representing the cycle time value. The scatter plot may include red rectangles are time windows where Station 440.1.1.1.1 was identified as the bottleneck. In some embodiments, hovering over position on the scatter plot will cause the user interface to indicate the related part number. The user may indicate use of the Percentile 10 as the bottleneck detection approach, indicate half an hour time window, and indicate the median to aggregate cycle times.

The user may select potential bottlenecks determined over various time windows and annotate them as unexpected bottlenecks in the database. When the time windows are continuous, users may use a brush or lasso tool in order to select the intended time windows and annotate them. In situations where all the detected time windows are bottlenecks, the user may use a "select all" button and add annotations to the group. The annotations will be stored as training data in the database for future use in the supervised bottleneck detection approach.

Part Cycle Time

In some embodiments, the systems and methods described herein may include a party cycle time interface which indicates which part type have the longest process time.

In some embodiments, the part cycle time interface may display the number of part types, and statistical information based on part types (e.g., average, median, and mode).

The user may determine that a part has a slightly higher cycle time when compared to the other two types.

Part Throughput Time

In some embodiments, a line-based throughput time refers to the time required for a part to travel from one station to another station. For example, a user may desire to view an estimation of the time required for a part to be process by the entire assembly line. The user-interface may allow a user to select a part and, in response to their selection, display the time required for the selected part to be processed by the entire assembly line.

FIG. 1 shows a system 100 for training a neural network. The system 100 may comprise an input interface for accessing training data 102 for the neural network. For example, as illustrated in FIG. 1, the input interface may be constituted by a data storage interface 104 which may access the training data 102 from a data storage 106. For example, the data storage interface 104 may be a memory interface or a persistent storage interface, e.g., a hard disk or an SSD interface, but also a personal, local or wide area network interface such as a Bluetooth, Zigbee or Wi-Fi interface or an ethernet or fiber optic interface. The data storage 106 may be an internal data storage of the system 100, such as a hard drive or SSD, but also an external data storage, e.g., a network-accessible data storage.

In some embodiments, the data storage 106 may further comprise a data representation 108 of an untrained version of the neural network which may be accessed by the system 100 from the data storage 106. It will be appreciated, however, that the training data 102 and the data representation 108 of the untrained neural network may also each be accessed from a different data storage, e.g., via a different subsystem of the data storage interface 104. Each subsystem may be of a type as is described above for the data storage interface 104.

In some embodiments, the data representation 108 of the untrained neural network may be internally generated by the system 100 on the basis of design parameters for the neural network, and therefore may not explicitly be stored on the data storage 106. The system 100 may further comprise a processor subsystem 110 which may be configured to, during operation of the system 100, provide an iterative function as a substitute for a stack of layers of the neural network to be trained. Here, respective layers of the stack of layers being substituted may have mutually shared weights and may receive as input, an output of a previous layer, or for a first layer of the stack of layers, an initial activation, and a part of the input of the stack of layers.

The processor subsystem 110 may be further configured to iteratively train the neural network using the training data 102. Here, an iteration of the training by the processor subsystem 110 may comprise a forward propagation part and a backward propagation part. The processor subsystem 110 may be configured to perform the forward propagation part by, amongst other operations defining the forward propagation part which may be performed, determining an equilibrium point of the iterative function at which the iterative function converges to a fixed point, wherein determining the equilibrium point comprises using a numerical root-finding algorithm to find a root solution for the iterative function minus its input, and by providing the equilibrium point as a substitute for an output of the stack of layers in the neural network.

The system 100 may further comprise an output interface for outputting a data representation 112 of the trained neural network, this data may also be referred to as trained model data 112. For example, as also illustrated in FIG. 1, the output interface may be constituted by the data storage interface 104, with said interface being in these embodiments an input/output ('IO') interface, via which the trained model data 112 may be stored in the data storage 106. For example, the data representation 108 defining the 'untrained' neural network may during or after the training be replaced, at least in part by the data representation 112 of the trained neural network, in that the parameters of the neural network, such as weights, hyper-parameters and other types of parameters of neural networks, may be adapted to reflect the training on the training data 102. This is also illustrated in FIG. 1 by the reference numerals 108, 112 referring to the same data record on the data storage 106. In some embodiments, the data representation 112 may be stored separately from the data representation 108 defining the 'untrained' neural network. In some embodiments, the output interface may be separate from the data storage interface 104, but may in general be of a type as described above for the data storage interface 104.

Figure 2:
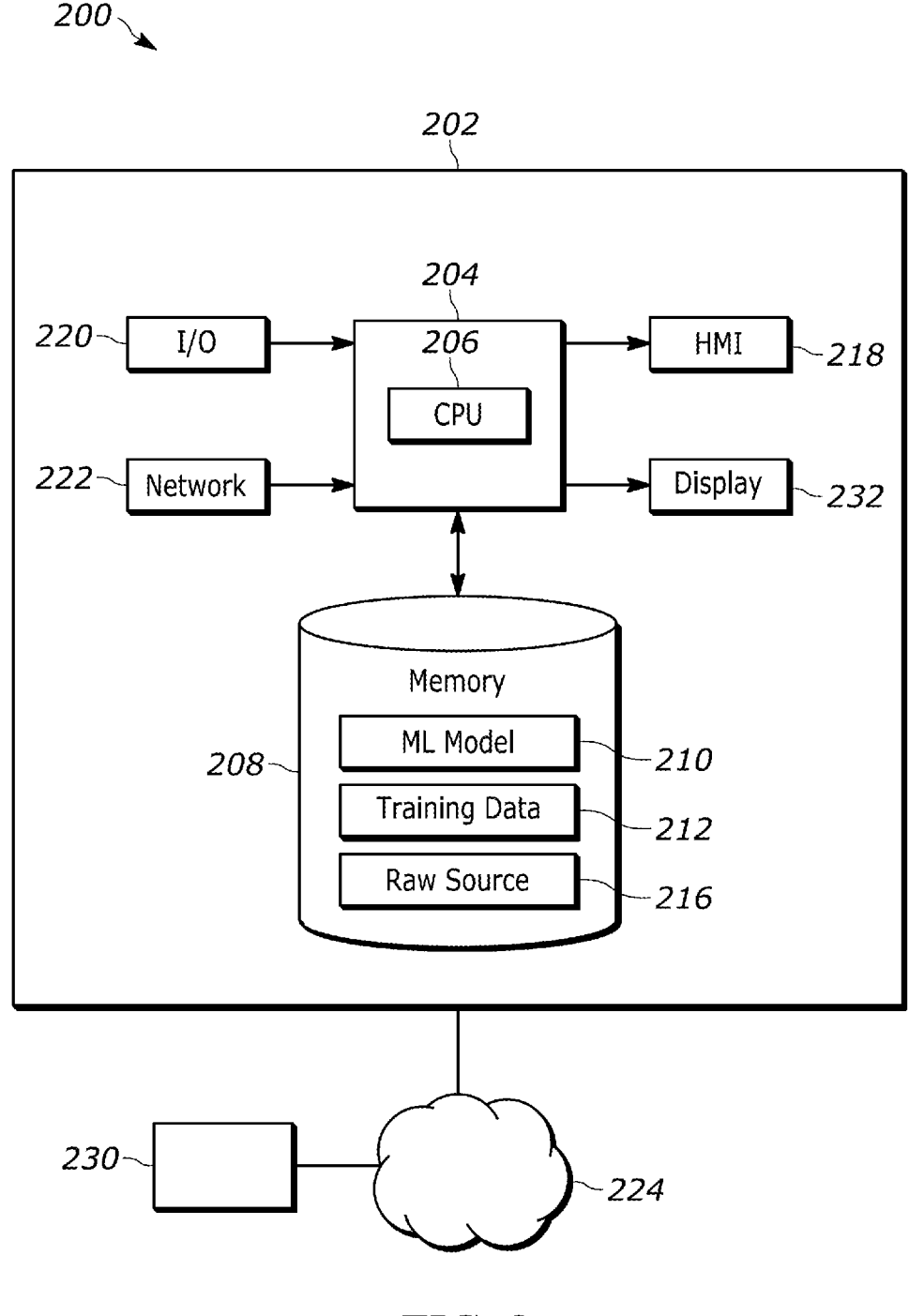
FIG. 2 depicts a computing system to implement a system for annotating data.

FIG. 2 depicts a computing system 200 to implement a system for annotating data. The computing system 200 may include at least one computing system 202. The computing system 202 may include processor 204 that is operatively connected to a memory unit 208. The processor 204 may include one or more integrated circuits that implement the functionality of a central processing unit (CPU) 206. The CPU 206 may be a processing unit that implements an instruction set such as one of the x86, ARM, Power, or MIPS instruction set families. During operation, the CPU 206 may execute stored program instructions that are retrieved from the memory unit 208. The stored program instructions may include software that controls operation of the CPU 206 to perform the operation described herein. In some examples, the processor 204 may be a system on a chip (SoC) that integrates functionality of the CPU 206, the memory unit 208, a network interface, and input/output interfaces into a single integrated device. The computing system 202 may implement an operating system for managing various aspects of the operation.

The memory unit 208 may include volatile memory and non-volatile memory for storing instructions and data. The non-volatile memory may include solid-state memories, such as NAND flash memory, magnetic and optical storage media, or any other suitable data storage device that retains data when the computing system 202 is deactivated or loses electrical power. The volatile memory may include static and dynamic random-access memory (RAM) that stores program instructions and data. For example, the memory unit 208 may store a machine-learning algorithm 210 or algorithm, a training dataset 212 for the machine-learning algorithm 210, raw source data 215.

The computing system 202 may include a network interface device 222 that is configured to provide communication with external systems and devices. For example, the network interface device 222 may include a wired and/or wireless Ethernet interface as defined by Institute of Electrical and Electronics Engineers (IEEE) 802.11 family of standards. The network interface device 222 may include a cellular communication interface for communicating with a cellular network (e.g., 3G, 4G, 5G). The network interface device 222 may be further configured to provide a communication interface to an external network 224 or cloud.

The external network 224 may be referred to as the world-wide web or the Internet. The external network 224 may establish a standard communication protocol between computing devices. The external network 224 may allow information and data to be easily exchanged between computing devices and networks. One or more servers 330 may be in communication with the external network 224.

The computing system 202 may include an input/output (I/O) interface 220 that may be configured to provide digital and/or analog inputs and outputs. The I/O interface 220 may include additional serial interfaces for communicating with external devices (e.g., Universal Serial Bus (USB) interface).

The computing system 202 may include a human-machine interface (HMI) device 218 that may include any device that enables the computing system 200 to receive control input. Examples of input devices may include human interface inputs such as keyboards, mice, touchscreens, voice input devices, and other similar devices. The computing system 202 may include a display device 232. The computing system 202 may include hardware and software for outputting graphics and text information to the display device 232. The display device 232 may include an electronic display screen, projector, printer or other suitable device for displaying information to a user or operator. The computing system 202 may be further configured to allow interaction with remote HMI and remote display devices via the network interface device 222.

The computing system 200 may be implemented using one or multiple computing systems. While the example depicts a single computing system 202 that implements all of the described features, it is intended that various features and functions may be separated and implemented by multiple computing units in communication with one another. The particular system architecture selected may depend on a variety of factors.

The computing system 200 may implement a machine-learning algorithm 210 that is configured to analyze the raw source data 215. The raw source data 215 may include raw or unprocessed sensor data that may be representative of an input dataset for a machine-learning system. The raw source data 215 may include video, video segments, images, text-based information, and raw or partially processed sensor data (e.g., radar map of objects). In some examples, the machine-learning algorithm 210 may be a neural network algorithm that is designed to perform a predetermined function. For example, the neural network algorithm may be configured in automotive applications to identify pedestrians in video images.

The computer system 200 may store a training dataset 212 for the machine-learning algorithm 210. The training dataset 212 may represent a set of previously constructed data for training the machine-learning algorithm 210. The training dataset 212 may be used by the machine-learning algorithm 210 to learn weighting factors associated with a neural network algorithm. The training dataset 212 may include a set of source data that has corresponding outcomes or results that the machine-learning algorithm 210 tries to duplicate via the learning process. In this example, the training dataset 212 may include source videos with and without pedestrians and corresponding presence and location information. The source videos may include various scenarios in which pedestrians are identified.

The machine-learning algorithm 210 may be operated in a learning mode using the training dataset 212 as input. The machine-learning algorithm 210 may be executed over a number of iterations using the data from the training dataset 212. With each iteration, the machine-learning algorithm 210 may update internal weighting factors based on the achieved results. For example, the machine-learning algorithm 210 can compare output results (e.g., annotations) with those included in the training dataset 212. Since the training dataset 212 includes the expected results, the machine-learning algorithm 210 can determine when performance is acceptable. After the machine-learning algorithm 210 achieves a predetermined performance level (e.g., 100% agreement with the outcomes associated with the training dataset 212), the machine-learning algorithm 210 may be executed using data that is not in the training dataset 212. The trained machine-learning algorithm 210 may be applied to new datasets to generate annotated data.

The machine-learning algorithm 210 may be configured to identify a particular feature in the raw source data 215. The raw source data 215 may include a plurality of instances or input dataset for which annotation results are desired. For example, the machine-learning algorithm 210 may be configured to identify the presence of a pedestrian in video images and annotate the occurrences. The machine-learning algorithm 210 may be programmed to process the raw source data 215 to identify the presence of the particular features. The machine-learning algorithm 210 may be configured to identify a feature in the raw source data 215 as a predetermined feature (e.g., pedestrian). The raw source data 215 may be derived from a variety of sources. For example, the raw source data 215 may be actual input data collected by a machine-learning system. The raw source data 215 may be machine generated for testing the system. As an example, the raw source data 215 may include raw video images from a camera.

In the example, the machine-learning algorithm 210 may process raw source data 215 and output an indication of a representation of an image. The output may also include augmented representation of the image. A machine-learning algorithm 210 may generate a confidence level or factor for each output generated. For example, a confidence value that exceeds a predetermined high-confidence threshold may indicate that the machine-learning algorithm 210 is confident that the identified feature corresponds to the particular feature. A confidence value that is less than a low-confidence threshold may indicate that the machine-learning algorithm 210 has some uncertainty that the particular feature is present.

FIG. 3 is a flowchart of an example process 300 for identifying a potential bottle neck in an assembly line. In some implementations, one or more process blocks of FIG. 3 may be performed by a machine-learning algorithm 210. In some implementation the process 300 may be performed by processor 204 of computing system 200.

As shown in FIG. 3, process 300 may include receiving, for a plurality of stations, processing times indicating a time required for a part to be processed by each station, and waiting times indicating how long the part waited before moving to a subsequent one of the plurality of stations (block 302). For example, a computing device associated with the assembly line may receive cycle time values, timestamps, part types, assembly lines, and any relevant information as input and calculate waiting times for a part based on the received inputs. In some embodiments, the received inputs and the calculated waiting times are stored in a database associated with the computing system 200.

As also shown in FIG. 3, process 300 may include determining, for the plurality of stations, cycle times for a predetermined window of time, where the cycle times indicates an average number of parts processed by the plurality of stations during the predetermined window of time (block 304). For example, computing system 200 may generate a record every time a part is processed by a station, which results in records for every instance of a part passing through every station in the assembly line. In some embodiments, the records generated are stored in a database associated with the computing system 200. In some embodiments, the process 300 may calculate cycle time based on, but not limited to, active time (i.e., time interval between a part's entrance to a station and its exit), process time (i.e., time interval between a part's departure from one station and its arrival to the next), and thorough put time (i.e., time interval between a part's departure from a station and its departure from the following station).

As further shown in FIG. 3, process 300 may include determining one of the stations as a potential bottleneck station based on the processing times, the waiting times, and the cycle times (block 306). For example, computing system 200 may, when determining a station as a potential bottleneck, utilize detection algorithms which include, but are not limited to, heuristic approach (e.g., stations with top 10% or 25% cycle time values) and machine learning method (e.g., logistic regression on time-series data). In some embodiments, the process 300 may detect bottlenecks based on candidate-pool based heuristic and supervised machine learning model based approaches.

As also shown in FIG. 3, process 300 may include displaying, to a user, the potential bottleneck station as a visualization which includes the processing time, the waiting time, and the cycle time of the potential bottleneck station (block 308). For example, when a potential bottleneck has been identified the process 300 may generates a visualization which includes the processing time, the waiting time, and the cycle time of the potential bottleneck station. In some embodiments, the potential bottleneck visualization may allow the user to explore details related to the station identified as a potential bottle neck. Further, the visualization interface may allow the user to customize the metrics used to determine a station as being a potential bottleneck such as, but not limited to, time windows, percentiles, standard deviations, and other appropriate visualization customizations as discussed above.

As further shown in FIG. 3, process 300 may include receiving, from the user, a user feedback related to the potential bottleneck station (block 310). For example, the process 300 may display to a user a visualization based on the metrics stored in a databased associated with the computing system 200 and visually indicate which station from the plurality of station has been identified as a potential bottleneck. In some embodiments the user may be provided with options to annotate the identified potential bottleneck as being one of, but not limited to: an expected bottleneck, an unexpected bottleneck, or not a bottleneck.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

FIG. 4 is a flowchart of an example process 400 which focuses on utilization of a machine learning model in identifying potential bottlenecks in an assembly line. In some implementations, one or more process blocks of FIG. 4 may be performed by a machine-learning network. In some implementation the process 400 may be performed by processor 204 of computing system 200.

As shown in FIG. 4, process 400 may include receiving, for a plurality of stations, processing times indicating a time required for a part to be processed by each station, and waiting times indicating how long the part waited before moving to a subsequent one of the plurality of stations (block 402). For example, a computing device associated with the assembly line may receive cycle time values, timestamps, part types, assembly lines, and any relevant information as input and calculate waiting times for a part based on the received inputs. In some embodiments, the received inputs and the calculated waiting times are stored in a database associated with the computing system 200.

As also shown in FIG. 4, process 400 may include determining, for the plurality of stations, cycle times for a predetermined window of time, where the cycle times indicates an average number of parts processed by the plurality of stations during the predetermined window of time (block 404). For example, computing system 200 may generate a record every time a part is processed by a station, which results in records for every instance of a part passing through every station in the assembly line. In some embodiments, the records generated are stored in a database associated with the computing system 200. In some embodiments, the process 400 may calculate cycle time based on, but not limited to, active time (i.e., time interval between a part's entrance to a station and its exit), process time (i.e., time interval between a part's departure from one station and its arrival to the next), and thorough put time (i.e., time interval between a part's departure from a station and its departure from the following station).

As further shown in FIG. 4, process 400 may include determining, by a pre-trained machine learning model, one of the stations as a potential bottleneck station based on the processing times, the waiting times, and the cycle times (block 406). For example, a supervised machine learning model may be utilized which takes cycle time values, timestamps, part types, and all relevant metrics to detect potential bottle necks. In some embodiments, a heuristic-based approach may be utilized with a supervised machine learning model which may by further trained with human annotations. For example, the user may give feedback regarding the proposed station being an expected bottleneck, an unexpected bottleneck, or not a bottleneck. The process 400 may store data by uploading to the cloud as training data which may be used in future bottleneck detection tasks as well as future training of the bottle neck detection machine learning models.

For example, a heuristic rule may indicate that the first line uses percentile 10, where stations whose aggregated cycle time are longer than the top 10% of the 18 stations will be identified as a candidate pool of bottlenecks. In some embodiments, the second line presents the threshold of percentile 25, which identifies stations with top 25% aggregated cycle time as a candidate pool of bottlenecks.

In some embodiments, the one or more machine learning models may be trained using training data. The training data may include labeled inputs (e.g., cycle time values, timestamps, part types, and all relevant metrics to detect potential bottle necks) that are mapped to labeled outputs (e.g., stations associated with potential bottlenecks). Such training may be referred to as supervised learning. Additional types of training may be used, such as unsupervised learning where the training data is not labeled, and the machine learning models group clusters of the unlabeled training data based on patterns. The patterns may relate to certain characteristics being associated with certain probabilities of eligibilities than other probabilities. In addition, reinforcement learning may be used to train the one or more machine learning models, where a reward is associated with the models correctly determining a probability for one or more characteristics, such that the machine learning models reinforces (e.g., adjusts weights and/or parameters) selecting that probability for those characteristics. In some embodiments, some combination of supervised learning, unsupervised learning, and/or reinforcement learning may be used to train the one or more machine learning models.

As also shown in FIG. 4, process 400 may include displaying, to a user, the potential bottleneck station as a visualization which includes the processing time, the waiting time, and the cycle time of the potential bottleneck station (block 408). For example, when a potential bottleneck has been identified the process 400 may generates a visualization which includes the processing time, the waiting time, and the cycle time of the potential bottleneck station. In some embodiments, the potential bottleneck visualization may allow the user to explore details related to the station identified as a potential bottle neck. Further, the visualization interface may allow the user to customize the metrics used to determine a station as being a potential bottleneck such as, but not limited to, time windows, percentiles, standard deviations, and other appropriate visualization customizations as discussed above.

As further shown in FIG. 4, process 400 may include receiving, from the user, a user feedback related to the potential bottleneck station (block 410). For example, the process 400 may display to a user a visualization based on the metrics stored in a databased associated with the computing system 200 and visually indicate which station from the plurality of station has been identified as a potential bottleneck by the machine learning model. In some embodiments the user may be provided with options to annotate the identified potential bottleneck as being one of, but not limited to: an expected bottleneck, an unexpected bottleneck, or not a bottleneck. The process 400 may store the data related to the potential bottleneck and the input of the user as training data to train future iteration of the machine learning model.

As further shown in FIG. 4, process 400 may include updating the set of heuristic rules, based on a user feedback indicating the potential bottleneck station is not a bottleneck, to output a result that is may include with the user feedback (block 412). For example, the process 400 may update weights related to how averages are calculated to produce a result where the station indicated as not a bottleneck is no longer calculated as a bottleneck. In some embodiments, the heuristic rules of the machine learning model may be updated based on patterns that emerge based on the input received by the user. For example, if a specific station is consistently flagged as a potential bottle neck by the machine learning model and consistently indicated as not being a bottleneck by the user; a rule excluding that station may be adopted by the machine learning model. Similar patterns may emerge related to specific parts, times, users, stations, assembly lines, shifts, factories, tolerances, thresholds, methods of manufacture, and any other appropriate aspect of an assembly line.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
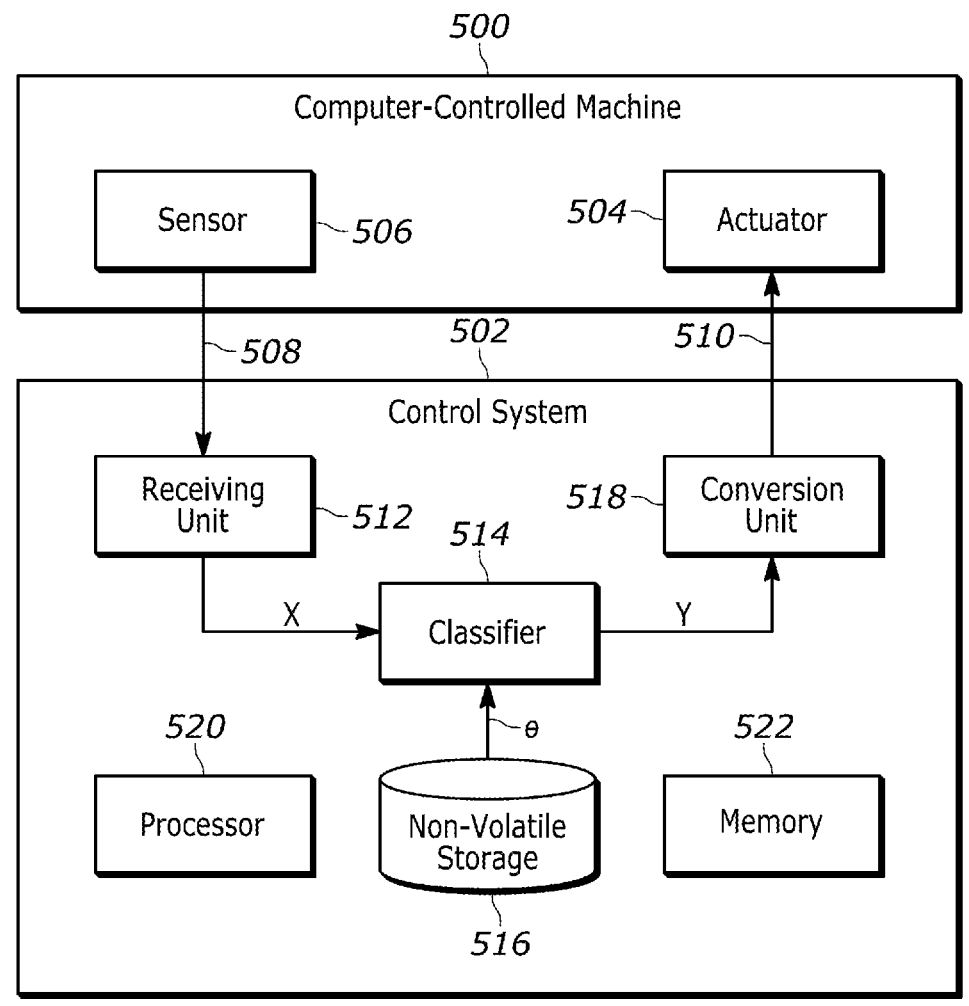
FIG. 5 depicts a schematic diagram of an interaction between computer-controlled machine and control system.

FIG. 5 depicts a schematic diagram of an interaction between computer-controlled machine 500 and control system 502. Computer-controlled machine 500 includes actuator 504 and sensor 506. Actuator 504 may include one or more actuators and sensor 506 may include one or more sensors. Sensor 506 is configured to sense a condition of computer-controlled machine 500. Sensor 506 may be configured to encode the sensed condition into sensor signals 508 and to transmit sensor signals 508 to control system 502 (e.g., part ID, part location, part timestamp, and part status). Non-limiting examples of sensor 506 include video, radar, LiDAR, ultrasonic and motion sensors. In some embodiments, sensor 506 is an optical sensor configured to sense optical images of an environment proximate to the computer-controlled machine 500.

Control system 502 is configured to receive sensor signals 508 from computer-controlled machine 500. As set forth below, control system 502 may be further configured to compute actuator control commands 510 depending on the sensor signals and to transmit actuator control commands 510 to actuator 504 of computer-controlled machine 500.

As shown in FIG. 5, control system 502 includes receiving unit 512. Receiving unit 512 may be configured to receive sensor signals 508 from sensor 506 and to transform sensor signals 508 into input signals x. In an alternative embodiment, sensor signals 508 are received directly as input signals x without receiving unit 512 such as time stamps from a station in an assembly line. Each input signal x may be a portion of each sensor signal 508. Receiving unit 512 may be configured to process each sensor signal 508 to product each input signal x. Input signal x may include data corresponding to an image recorded by sensor 506.

Control system 502 includes classifier 514. Classifier 514 may be configured to classify input signals x into one or more labels using a machine-learning (ML) algorithm, such as a neural network described above. Classifier 514 is configured to be parametrized by parameters, such as those described above (e.g., parameter 0). Parameters 0 may be stored in and provided by non-volatile storage 516. Classifier 514 is configured to determine output signals y from input signals x. Each output signal y includes information that assigns one or more labels to each input signal x. Classifier 514 may transmit output signals y to conversion unit 518. Conversion unit 518 is configured to covert output signals y into actuator control commands 510. Control system 502 is configured to transmit actuator control commands 510 to actuator 504, which is configured to actuate computer-controlled machine 500 in response to actuator control commands 510. In some embodiments, actuator 504 is configured to actuate computer-controlled machine 500 based directly on output signals y.

Upon receipt of actuator control commands 510 by actuator 504, actuator 504 is configured to execute an action corresponding to the related actuator control command 510. Actuator 504 may include a control logic configured to transform actuator control commands 510 into a second actuator control command, which is utilized to control actuator 504. In one or more embodiments, actuator control commands 510 may be utilized to control a display instead of or in addition to an actuator.

In some embodiments, control system 502 includes sensor 506 instead of or in addition to computer-controlled machine 500 including sensor 506. Control system 502 may also include actuator 504 instead of or in addition to computer-controlled machine 500 including actuator 504.

As shown in FIG. 5, control system 502 also includes processor 520 and memory 522. Processor 520 may include one or more processors. Memory 522 may include one or more memory devices. The classifier 514 (e.g., ML algorithms) of one or more embodiments may be implemented by control system 502, which includes non-volatile storage 516, processor 520 and memory 522.

Non-volatile storage 516 may include one or more persistent data storage devices such as a hard drive, optical drive, tape drive, non-volatile solid-state device, cloud storage or any other device capable of persistently storing information. Processor 520 may include one or more devices selected from high-performance computing (HPC) systems including high-performance cores, microprocessors, microcontrollers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 522. Memory 522 may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information.

Processor 520 may be configured to read into memory 522 and execute computer-executable instructions residing in non-volatile storage 516 and embodying one or more ML algorithms and/or methodologies of one or more embodiments. Non-volatile storage 516 may include one or more operating systems and applications. Non-volatile storage 516 may store compiled and/or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

Upon execution by processor 520, the computer-executable instructions of non-volatile storage 516 may cause the control system 502 to implement one or more of the ML algorithms and/or methodologies as disclosed herein. Non-volatile storage 516 may also include ML data (including data parameters) supporting the functions, features, and processes of the one or more embodiments described herein.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

The processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

Figure 6:
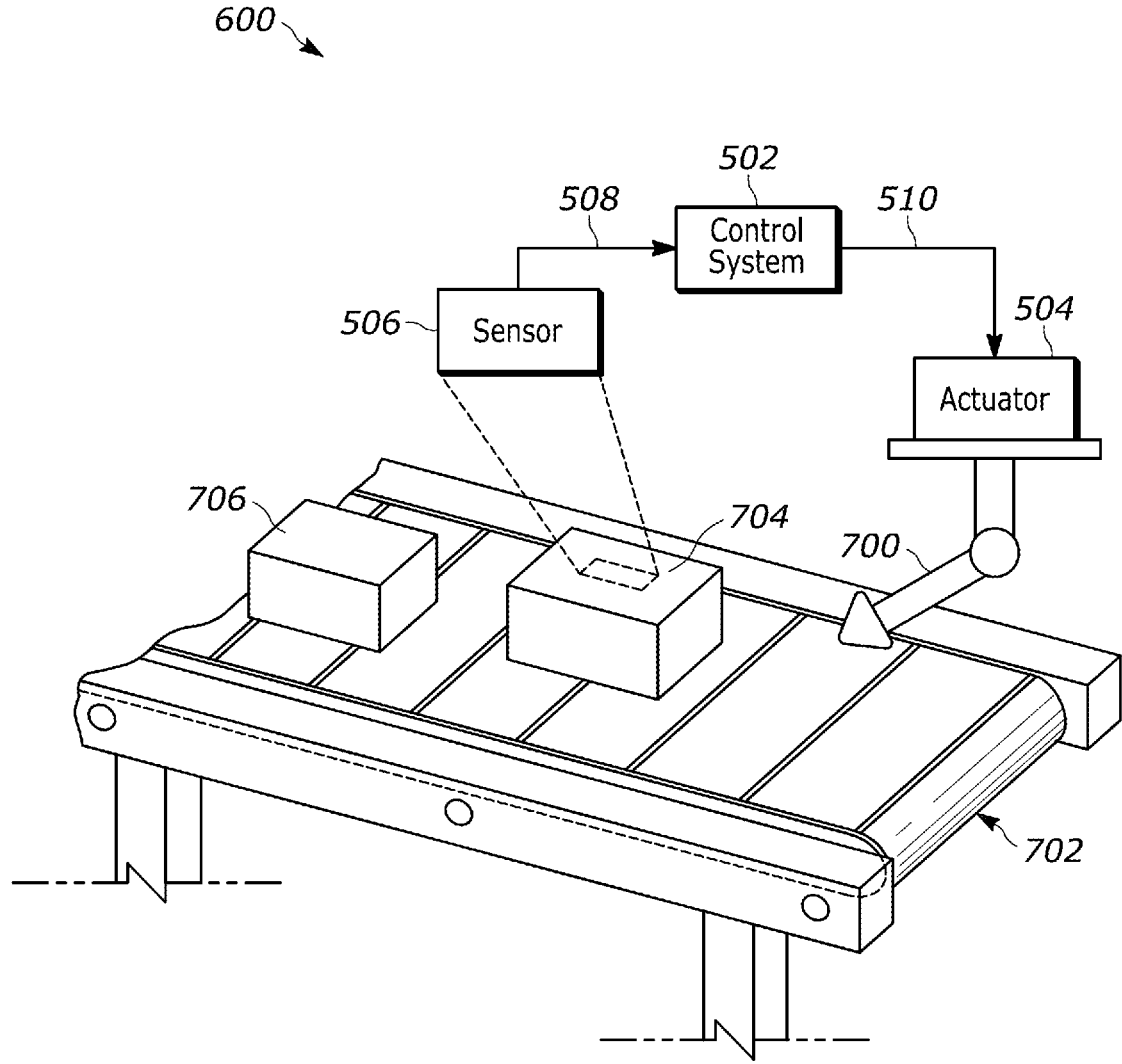
FIG. 6 depicts a schematic diagram of control system configured according to the present disclosure.

FIG. 6 depicts a schematic diagram of control system 502 configured to control system 700 (e.g., an assembly station), such as a punch cutter, a cutter or a gun drill, of manufacturing system 702, such as part of an assembly line. Control system 502 may be configured to control actuator 504, which is configured to control system 700 (e.g., assembly station).

Sensor 506 of control system 700 (e.g., assembly station) may be an optical sensor configured to capture one or more properties of manufactured product 704. Classifier 514 may be configured to determine a state of manufactured product 704 from one or more of the captured properties. Actuator

504 may be configured to control system 700 (e.g., assembly station) depending on the determined state of manufactured product 704 for a subsequent manufacturing step of manufactured product 704. The actuator 504 may be configured to control functions of control system 700 (e.g., assembly station) on subsequent manufactured product 706 of control system 700 (e.g., assembly station) depending on the determined state of manufactured product 704.

Figure 7:
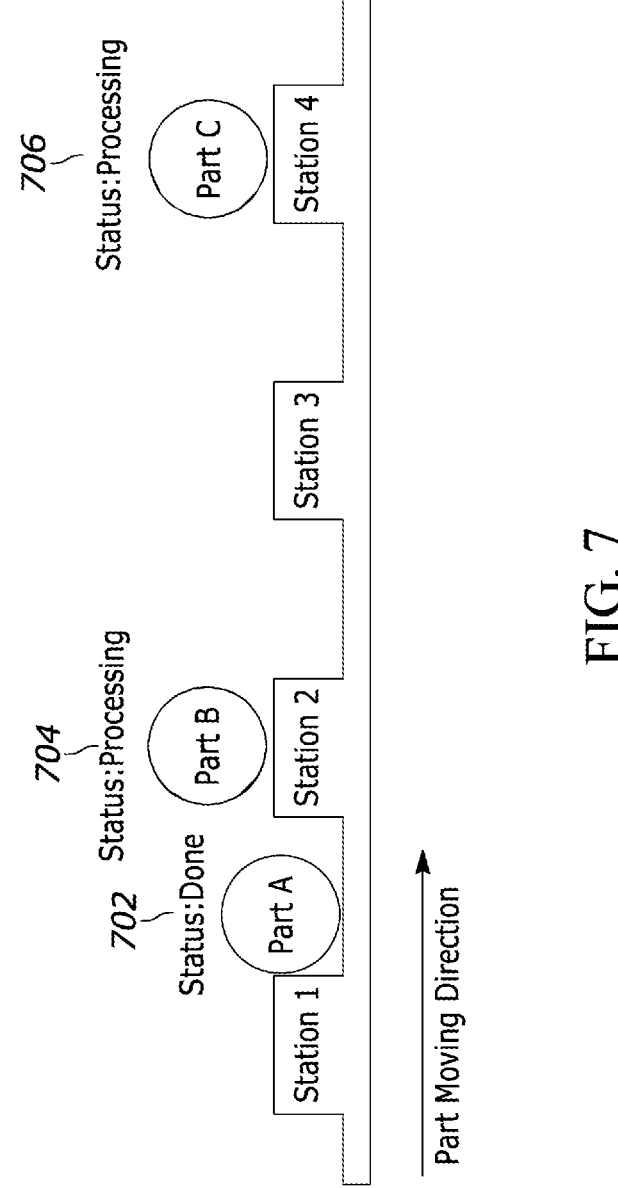
FIG. 7 depicts an example embodiment of a manufacturing line for processing parts, according to the present disclosure.

FIG. 7 depicts an example embodiment of a manufacturing line (a.k.a., assembly line) for processing parts, according to the present disclosure. In some implementation the manufacturing line may be performed by processor 204 of computing system 200.

At 702, a part A has been processed by station 1 and is awaiting processing by station 2. While at station 1 and awaiting further processing the status of part A is "done." In some embodiments, part A cannot move on to station 2 while a part B is still processing. At 704, the manufacturing line 700 has part B processing at station 2 while part A has already been processed by station 1 and is done. As a result, part A is waiting for part B to complete processing at station 2 in order to move on. In some embodiments, the regular occurrence of this situation may indicate that station 2 is a bottleneck. At 706, the manufacturing line 700 has a Part C being processed at station 5. In this example embodiment, there is no part in station 3 while station 2 maintains processing of part B; this may also indicate a bottle neck at station 2.

Figure 8:
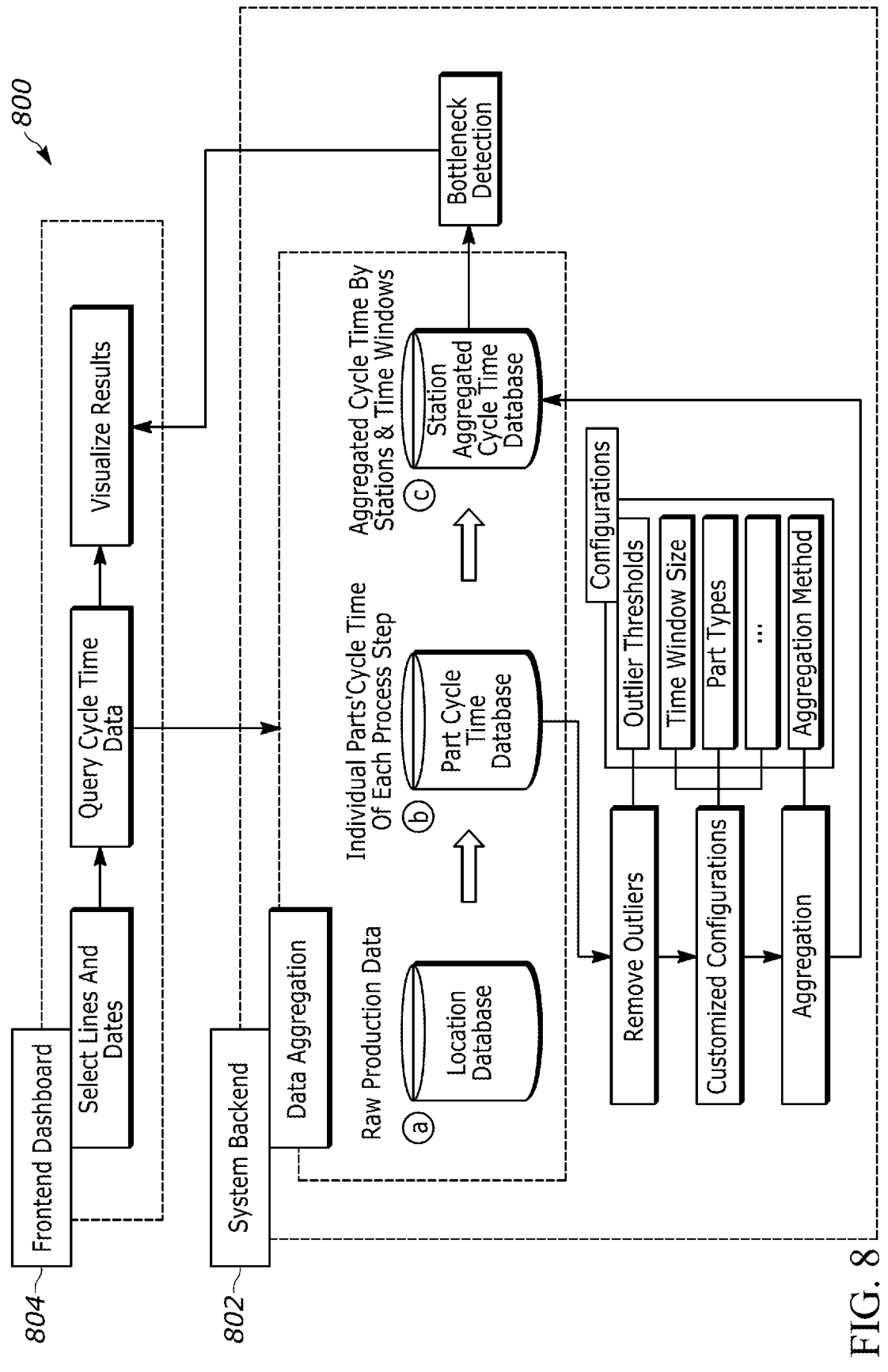
FIG. 8 depicts an example embodiment of an architecture configured to receive raw production data, store aggregated raw data, and detect bottle necks based on cycle time, according to the present disclosure.

FIG. 8 depicts an example embodiment of an architecture 800 configured to receive raw production data, store aggregated raw data, and detect bottle necks based on cycle time, according to the present disclosure. In some embodiments the architecture 800, may be implemented by processor 204 of computing system 200.

The architecture 800 includes a system backend 802 which may be configured to retrieve raw production data, compute part cycle times and aggregate the data in a variety of configurations. The aggregated data is stored in a database associated with the computing system 200. In some embodiments, raw production data is captures and may include, but is not limited to part ID, part location, part timestamp, and part status. In some embodiments, the cycle time may be calculated based on, but not limited to, active time, process time, and throughput time.

The system backend 802 may be configured to utilize a variety of approaches to remove outliers, such as: percentile (i.e., the top and bottom x % of values may be removed), median 2SD (i.e., values that are more than two standard deviations away from the median may be removed), mode 50% (i.e., values that are larger or smaller than 50% of the mode may be removed), domain specific criteria (e.g., the smallest 50 values will be retained), or any suitable outlier removal approach.

The system backend 802 may, after removing the outliers, selectively aggregate cycle time values based on predetermined customized configurations. These configurations may be requested by the end users. The predetermined configurations may include, but are not limit to, time window size and part types. Time window size refers to the time period which defines time window (e.g., minutes and seconds). Part types refers to category parts specific to each assembly line, where different part types may have different processing time.

The system backend 802 may aggregate stations' cycle time data each station of the assembly line. In some embodiments, aggregation refers to the procedure which compresses all the cycle time values which meet the customized configuration requirements for a station into a single value. For example, a production line may process one hundred parts in an hour and the systems and methods described herein may be configured to calculate a number to represent the performance of a specific hour. Aggregation methods include but are not limited to average (i.e., the average cycle time values of processed parts), median (i.e., the median cycle time values of processed parts), and average of mode (i.e., the average of cycle time values that are one standard deviation away from the mode).

The system backend 802 may be configured to calculate aggregation based on all possible configurations. For example, when there are four time window sizes (0.5 hour, 1 hour, 2 hours, and 8 hours), five outlier removal methods, 12 part types, and three aggregation methods, the batch-based aggregation will combine the above options. In some embodiments, the computation may be performed locally in the factories or in the cloud. All the data may be stored on computing devices locally in the assembly line facility or remotely in the cloud.

In some embodiments, the data aggregation may be performed on batched streaming data, wherein the data may be aggregated when it is stored in the database. Data aggregation may also be performed as the user queries data. In some embodiments, precomputing data may greatly reduce the query time.

Bottlenecks in a production line refers to the machine/station that requires a longer process time than the other stations. The system backend 802 may be configured to receive aggregated cycle time data and detect potential bottleneck candidates.

The system backend 802 may be configured to utilize detection algorithms which include, but are not limited to, heuristic approach (e.g., stations with top 10% or 25% cycle time values) and machine learning method (e.g., logistic regression on time-series data). The system backend 802 may detect bottlenecks based on candidate-pool based heuristic and supervised approaches.

The architecture 800 includes a frontend dashboard 804 which may include a visual analytics dashboard for a user to explore. In some embodiments, the visualization may be configured to display the data population as well as the bottleneck detection results and enable a user to explore the detailed information of bottleneck stations and relevant parts.

In some embodiments, the user may select which assembly lines and date periods to explore. A time period may vary from several days to several hours. The frontend dashboard 804 may be configured to query the assembly line's data from the individual and aggregated cycle time database. In some embodiments, the frontend dashboard 804 may display basic statistics of production in the user selected period, including but not limited to: number of parts, number of error parts, number of part types, and duration of downtime.

The frontend dashboard 804 may be configured to display a main dashboard including, but not limited to, the following components: stations' cycle time trends, parts cycle time, and line-based throughput time.

Figure 9:
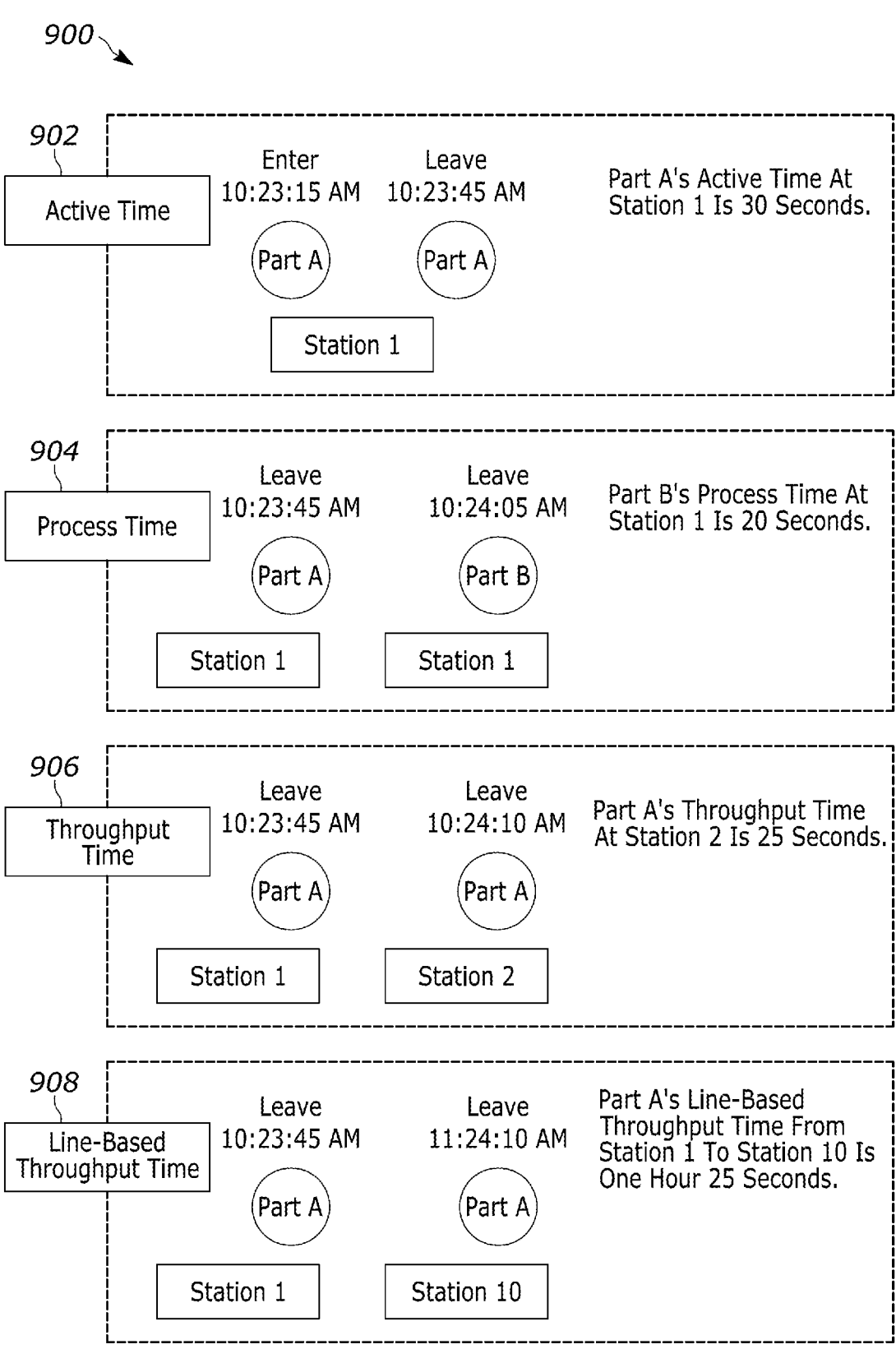
FIG. 9 depicts a diagram illustrating critical metric calculations for an assembly line, according to the present disclosure.

FIG. 9 depicts a diagram 900 illustrating critical metric calculations for a part production line, according to the present disclosure. Critical metrics may be calculated and/or tracked by processor 204 of computing system 200.

At 902, the diagram 900 illustrates an example calculation for an active time. In some embodiments, active time may refer to the time interval between a part's entrance to a station and its exit. For example, when a part A enters a station 1 and 10:23:14 AM and leaves the station 1 at 10:23:45 AM, the active time of the part A at the station 1 is 30 seconds.

At 904, the diagram 900 illustrates an example calculation for a process time. In some embodiments, the process time may refer to the time interval between a part's departure from one station and its arrival to the next. For example, when a part A leaves a station at 10:23:45 AM and a part B leaves the station at 10:24:05 AM the part B's processing time at the station is 20 seconds.

At 906, the diagram 900 illustrates an example calculation for a throughput time. In some embodiments, the throughput time may refer to the time interval between a part's departure from a station and its departure from the following station. For example, when a part leaves a first station at 10:23:45 AM and the part leaves a second station at 10:24:10 AM the part's throughput time at the second station is 25 seconds.

At 908, the diagram 900 illustrates an example calculation for a line-based throughput time. In some embodiments, the line-based throughput time refers to the time interval between a part's departure from the first station of an assembly line and its departure from the last station of the assembly line. For example, when a part A leaves the first station of an assembly line at 10:23:45 and leaves the final station of the assembly line at 11:24:10 AM the part's throughput time for the assembly line is 1 hour and 25 seconds.

Figure 10A:
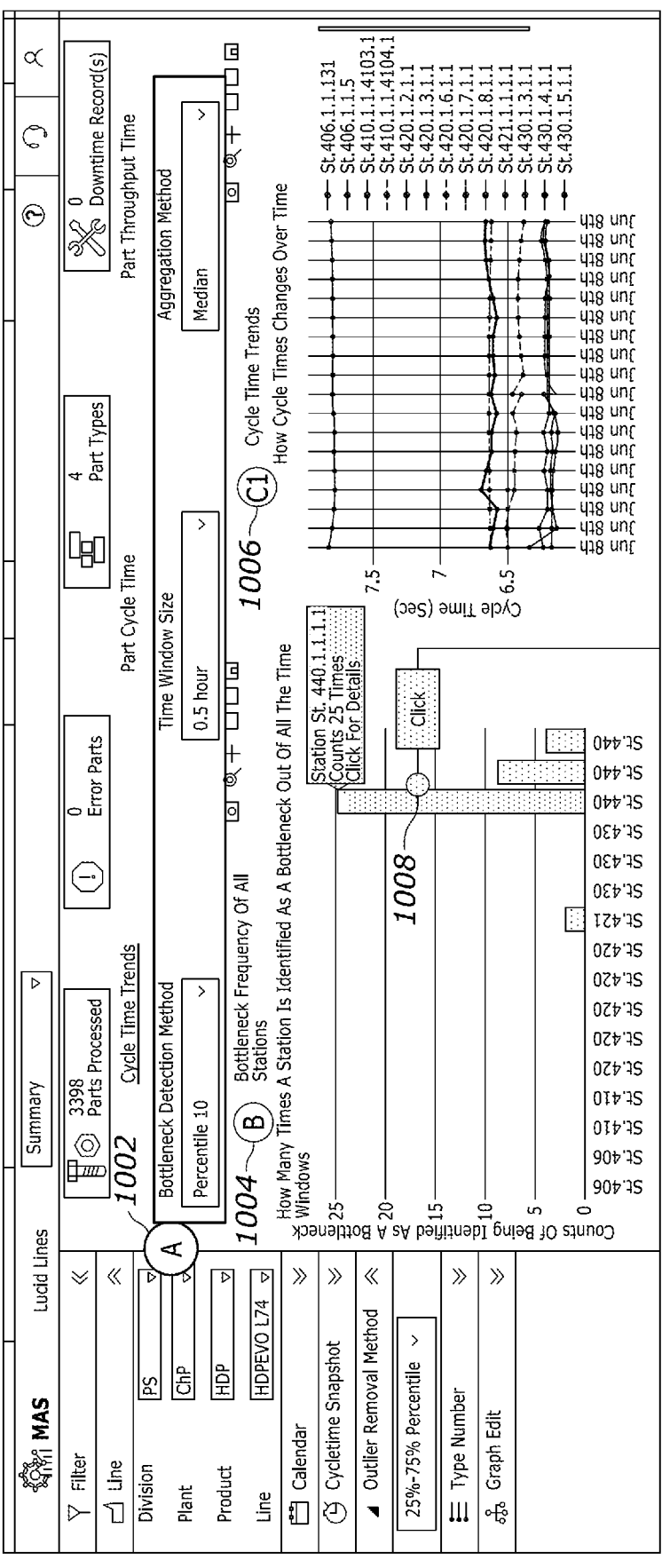
FIGS. 10A and 10B depicts example user interfaces and of a visual analytics dashboard displaying to the user visualizations indicating a possible bottleneck and accepting annotations of the data from a user, according to the present disclosure.
Figure 10B:
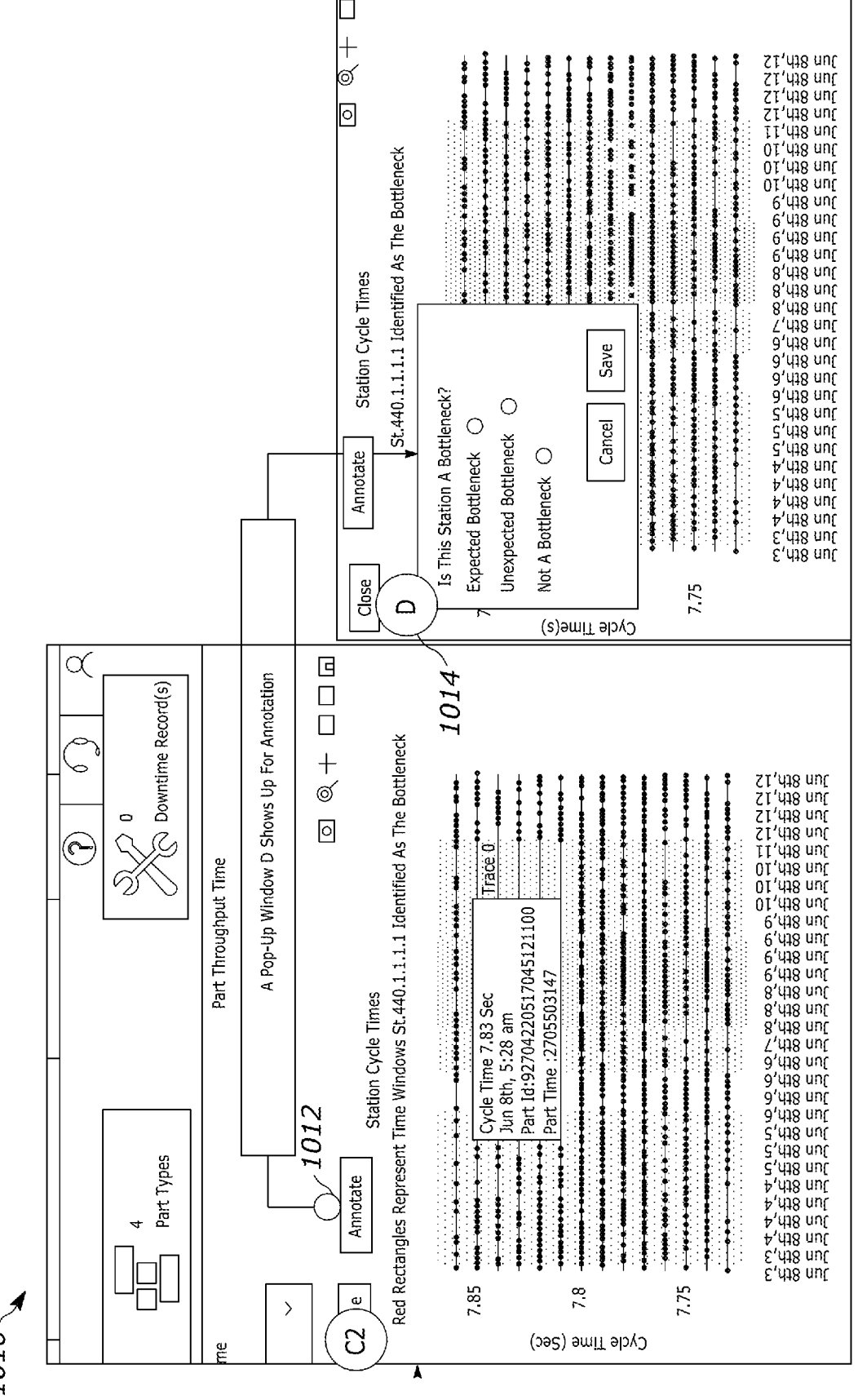

FIGS. 10A and 10B depicts example user interfaces 1000 and 1010 of a visual analytics dashboard displaying to the user visualizations indicating a possible bottle neck and accepting annotations of the data from a user, according to the present disclosure.

At user interface element 1002, of user interface 1000, the user alter metrics related to the visualizations. In some embodiments, drop boxes and/or text fields may be available to allow a user to alter bottleneck detection methods, time window lengths, aggregation methods, or any appropriate filter or data customization. At user interface element 1004, of user interface 1000, a bar graph may indicate in how many time windows a station is identified as a bottleneck. In some embodiments, the data may be displayed as any visualization including, but not limited to: bar charts, histograms, area charts, pie charts, scatter plots, line charts, box plots, heat maps, tree maps, Gantt charts, funnel charts, timelines, Venn diagrams, bubble charts, cartograms, dot distributions, Sankey diagrams, and flow maps.

At user interface element 1006, of user interface 1000, displays to a user a line graph, or any applicable visualization, which indicate cycle time trends of how stations' aggregated cycle times over time. In some embodiments, the x axis shows stations, while the y axes shows cycle time.

In response to clicking a visualization element associated with a station, interface 1010 will become available to the user. In some embodiments, the user interface 1010 may be displayed as a pop up, an overlay, in a separate screen, alongside the user interface 1000, or any appropriate method of displaying an interface to a user. At user interface element 1012, the user interface may include an annotate button associated with the selected station. In some embodiments, a user may click on the annotate button in order to generate user interface element 1014, which may be a menu consisting of annotation options for the selected station. At the user interface element 1014, of user interface 1010, the user may indicate whether the selected station is one of an expected bottleneck, an unexpected bottleneck, or not a bottleneck. In some embodiments, further annotation may be allowed in the form of a text box.

Figure 11:
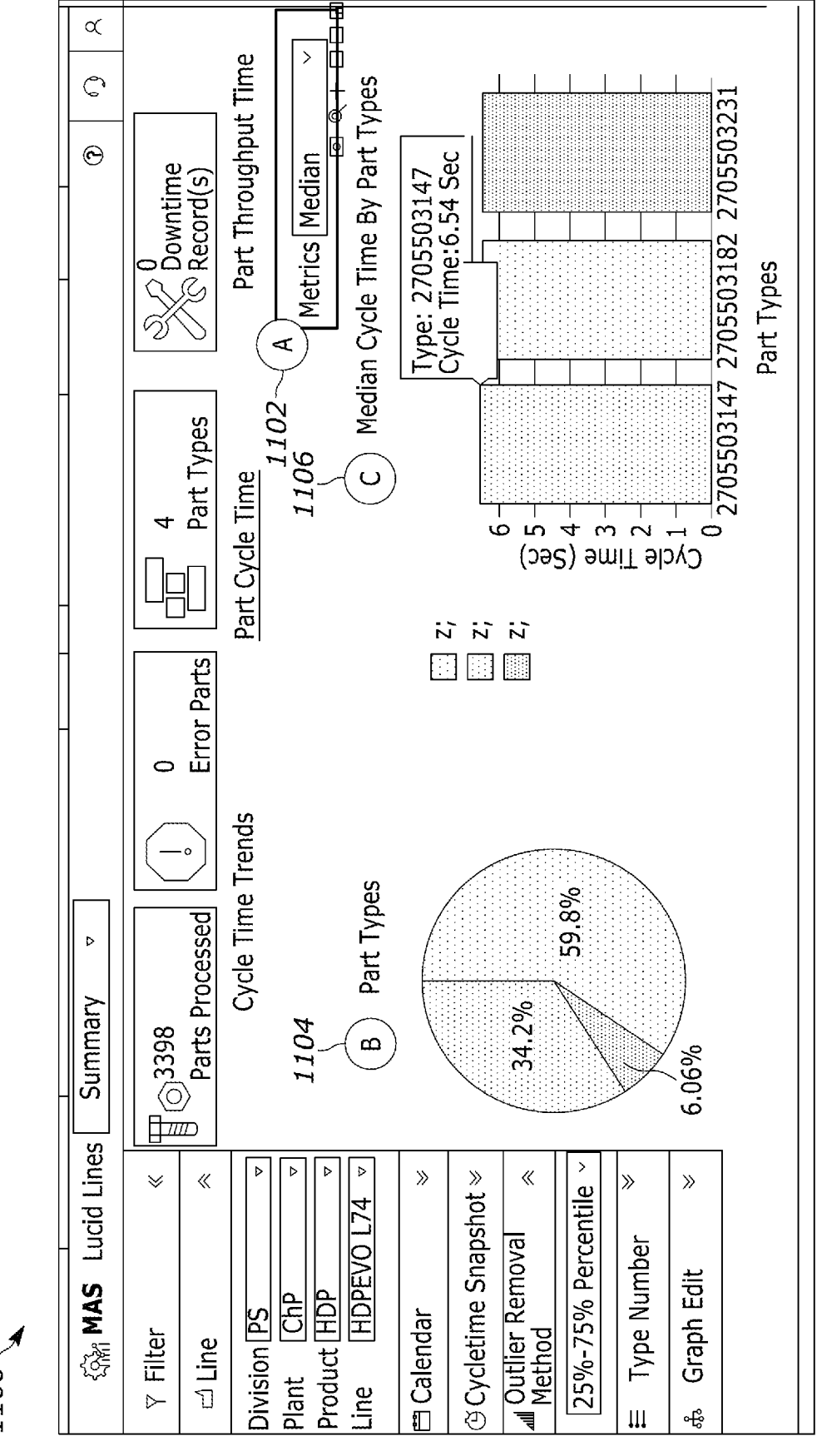
FIG. 11 depicts an example user interface for displaying visualizations of bottleneck detection metrics, in accordance with the present disclosure.

FIG. 11 depicts an example user interface 1100 for displaying visualizations of bottleneck detection metrics, in accordance with the present disclosure. At user interface element 1102, of user interface 1100, a user may indicate which average they wish to be displayed, a drop box may offer options including, but not limited to, average, median, mode, arithmetic mean, and mid-range. At user interface element 1104, of user interface 1100, may display a pie chart indicating the percentage of each part type associated with a selected station. At user interface element 1106, of user interface 1100, may display the average cycle time by part type.

In some embodiments, the user interface 1100 may include a party cycle time interface which indicates which part type have the longest process time. In some embodiments, the part cycle time interface may display the number of part types, and statistical information based on part types (e.g., average, median, and mode). The user may determine that a part has a slightly higher cycle time when compared to the other two types.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method for improving productivity in an industrial setting, the method comprising:

receiving, for a plurality of stations, processing times indicating a time required for a part to be processed by each station, and waiting times indicating how long the part waited before moving to a subsequent one of the plurality of stations;

determining, for the plurality of stations, cycle times for a predetermined window of time, where the cycle times indicates an average number of parts processed by the plurality of stations during the predetermined window of time;

determining one of the stations as a potential bottleneck station based on the processing times, the waiting times, and the cycle times;

displaying, to a user, the potential bottleneck station as a visualization which includes the processing times, the waiting times, and the cycle times of the potential bottleneck station;

receiving, from the user, a user feedback related to the potential bottleneck station wherein the user feedback indicates that the potential bottleneck station is not a bottleneck; and updating the visualization to indicate that the potential bottleneck station is not the bottleneck, wherein the determining of the one or more stations as the potential bottleneck station is further based on a comparison between an average cycle time of each station and a user-defined average cycle time threshold.

2. The method of claim 1, wherein the determining of the one or more stations as the potential bottleneck station is performed by a pre-trained machine learning model.

3. The method of claim 2, further comprising: determining, by the pre-trained machine learning model, the potential bottleneck based on a set of heuristic rules; and updating the set of heuristic rules, based on the user feedback indicating the potential bottleneck station is not the bottleneck, to output a result that is consistent with the user feedback.

4. The method of claim 2, further comprising: training the pre-trained machine learning model based on the processing time, the waiting time, the cycle time of the potential bottleneck station, and the user feedback.

5. The method of claim 1, wherein the user feedback indicates that the potential bottleneck station is one of: an expected bottleneck and an unexpected bottleneck.

6. The method of claim 1, wherein the visualization further includes at least one of a bar chart, histogram, area chart, pie chart, scatter plot, line chart, box plot, and heat map.

7. A device for improving productivity in an industrial setting comprising:

one or more processors configured to:

receive, for a plurality of stations, processing times indicating a time required for a part to be processed by each station, and waiting times indicating how long the part waited before moving to a subsequent one of the plurality of stations;

determine, for the plurality of stations, cycle times for a predetermined window of time, where the cycle times indicates an average number of parts processed by the plurality of stations during the predetermined window of time;

determine one of the stations as a potential bottleneck station by a pre-trained machine learning model based on the processing times, the waiting times, the cycle times, and a set of heuristic rules;

display, to a user, the potential bottleneck station as a visualization which includes the processing times, the waiting times, and the cycle times of the potential bottleneck station;

receive, from the user, a user feedback related to the potential bottleneck station; and update the set of heuristic rules, based on the user feedback indicating the potential bottleneck station is not a bottleneck, to output a result that is consistent with the user feedback, wherein determining of the one or more stations as the potential bottleneck station is further based on a comparison between an average cycle time of each station and a user-defined average cycle time threshold.

8. The device of claim 7, wherein the visualization further includes at least one of a bar chart, histogram, area chart, pie chart, scatter plot, line chart, box plot, and heat map.

9. The device of claim 7, wherein the predetermined window of time is determined based on input received from the user.

10. The device of claim 8, wherein the one or more processors are further configured to: train the pre-trained machine learning model based on the processing time, the waiting time, the cycle time of the potential bottleneck station, and the user feedback.

11. The device of claim 7, wherein the user feedback indicates that the potential bottleneck station is one of: an expected bottleneck and an unexpected bottleneck.

12. The device of claim 7, wherein the user feedback indicates that the potential bottleneck station is not the bottleneck, the one or more processors is further configured to: update the visualization to indicate that the potential bottleneck station is not a bottleneck.

13. A device for improving productivity in an industrial setting comprising: one or more processors configured to:

receive, for a plurality of stations, processing times indicating a time required for a part to be processed by each station, and waiting times indicating how long the part waited before moving to a subsequent one of the plurality of stations;

determine, for the plurality of stations, cycle times for a predetermined window of time, where the cycle times indicates an average number of parts processed by the plurality of stations during the predetermined window of time;

determine one of the stations as a potential bottleneck station based on the processing times, the waiting times, and the cycle times;

display, to a user, the potential bottleneck station as a visualization which includes the processing times, the waiting times, and the cycle times of the potential bottleneck station; and receive, from the user, a user feedback related to the potential bottleneck station wherein the user feedback indicates that the potential bottleneck station is not a bottleneck, wherein the determining of the one or more stations as the potential bottleneck station is further based on a comparison between an average cycle time of each station and a user-defined average cycle time threshold.

14. The device of claim 13, wherein the determining of the one or more stations as the potential bottleneck station is performed by a pre-trained machine learning model.

15. The device of claim 14, wherein the one or more processors are further configured to: determine, by the pre-trained machine learning model, the potential bottleneck based on a set of heuristic rules; and update the set of heuristic rules, based on the user feedback indicating the potential bottleneck station is not the bottleneck, to output a result that is consistent with the user feedback.

16. The device of claim 14, wherein the one or more processors are further configured to: train the pre-trained machine learning model based on the processing time, the waiting time, the cycle time of the potential bottleneck station, and the user feedback.

17. The device of claim 13, wherein the user feedback indicates that the potential bottleneck station is one of: an expected bottleneck and an unexpected bottleneck.

\* \* \* \* \*